(12) United States Patent
Pettey

(10) Patent No.: US 6,360,887 B1
(45) Date of Patent: *Mar. 26, 2002

(54) COMPACT DISC FOLDER BOOKLET

(75) Inventor: Thomas J. Pettey, Wayne, IL (US)

(73) Assignee: Glenbard Graphics, Inc., Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/821,337

(22) Filed: Mar. 20, 1997

Related U.S. Application Data

(63) Continuation-in-part of application No. 08/753,221, filed on Nov. 21, 1996, now Pat. No. 5,669,491.

(51) Int. Cl.[7] .............................................. B65D 85/87
(52) U.S. Cl. ................................... 206/232; 206/308.1
(58) Field of Search ................................. 206/232, 309, 206/311, 312, 313, 387.13, 308.1

(56) References Cited

U.S. PATENT DOCUMENTS

| | | | |
|---|---|---|---|
| 470,861 A | | 3/1892 | Chichester |
| 909,410 A | * | 1/1909 | Hirsch |
| 2,345,230 A | | 3/1944 | Bender |
| 2,435,856 A | | 2/1948 | Weingart |
| 2,523,129 A | * | 9/1950 | Maier ..................... 206/232 |
| 3,372,858 A | | 3/1968 | Brody |
| 3,592,381 A | | 7/1971 | Brody |
| 3,858,792 A | | 1/1975 | Volkert |
| 4,199,061 A | * | 4/1980 | Haskleroad et al. ........ 206/232 |
| 4,488,737 A | | 12/1984 | Jacobs et al. |
| 4,588,321 A | | 5/1986 | Egly |
| 4,640,413 A | * | 2/1987 | Kaplan et al. .............. 206/232 |
| 4,709,812 A | | 12/1987 | Kosterka |
| 4,793,477 A | | 12/1988 | Manning et al. |
| 4,832,191 A | | 5/1989 | Gerver et al. |
| 4,850,731 A | | 7/1989 | Youngs |
| 4,852,740 A | | 8/1989 | Sellar et al. |
| 4,905,831 A | | 3/1990 | Bagdis et al. |
| 5,048,681 A | | 9/1991 | Henkel |
| 5,085,318 A | | 2/1992 | Leverick |
| 5,101,973 A | | 4/1992 | Martinez |
| 5,147,036 A | | 9/1992 | Jacobs |
| 5,154,284 A | | 10/1992 | Starkey |
| 5,170,889 A | | 12/1992 | Cue |
| 5,193,681 A | | 3/1993 | Lieusay |
| 5,207,717 A | | 5/1993 | Manning et al. |
| 5,248,032 A | | 9/1993 | Sheu et al. |
| 5,318,222 A | | 6/1994 | Bartlett |
| 5,422,875 A | | 6/1995 | Bribach |
| 5,460,265 A | | 10/1995 | Kiolbasa |
| 5,462,160 A | | 10/1995 | Youngs |
| 5,472,083 A | | 12/1995 | Robinson et al. |
| D369,106 S | | 4/1996 | Baker et al. |
| 5,590,912 A | | 1/1997 | Stevens |
| 5,669,491 A | | 9/1997 | Pettey |
| 5,713,605 A | | 2/1998 | Pace et al. |

FOREIGN PATENT DOCUMENTS

NL   8702565   5/1989

OTHER PUBLICATIONS

America On–Line pocket style CD Folder (1996).
America On–Line folder style CD–ROM folder (1997.

* cited by examiner

Primary Examiner—Sam Rimell
(74) Attorney, Agent, or Firm—Vedder Price Kaufman & Kammholz

(57) ABSTRACT

A compact disc folder in the form of a booklet is disclosed which has a multi-page booklet portion held between two opposing panels of a cover portion. The front panel of the cover portion includes a pocket formed thereon in opposition to the booklet portion. The pocket includes two opposing flaps by which it is attached to the front panel and one of the flaps includes a notch that permits the flap to lie flat on the front panel without interfering with the booklet portion so that the folder will lie flat when closed. A second pocket may be formed in the cover portion to accommodate a thick booklet.

20 Claims, 10 Drawing Sheets

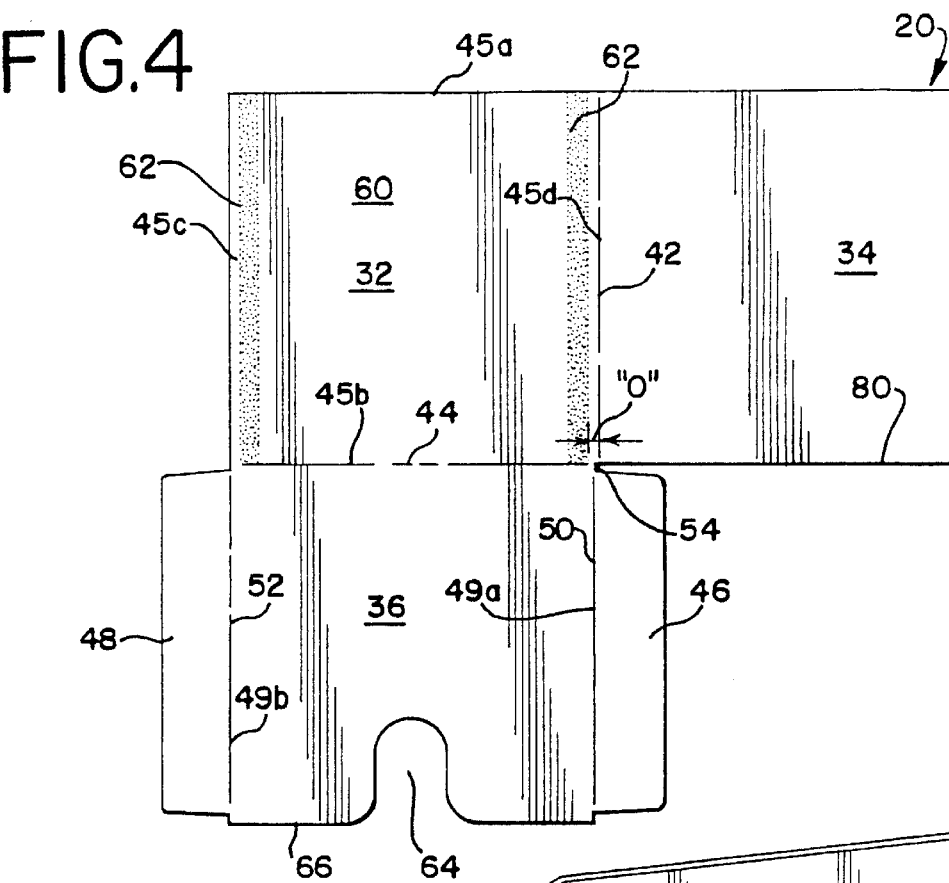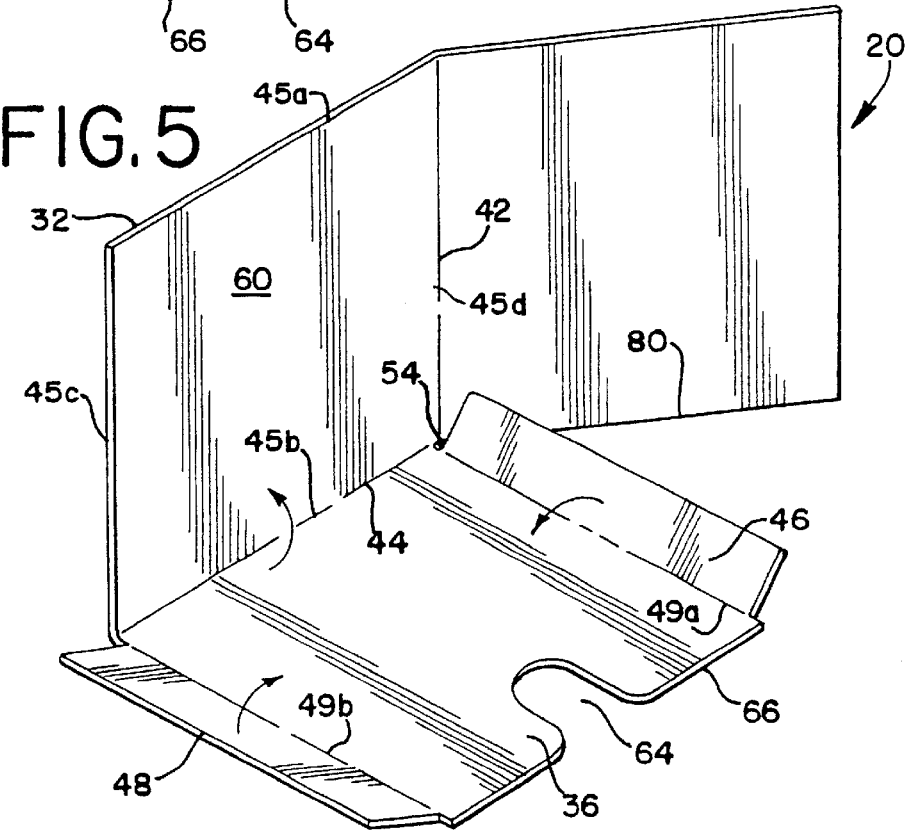

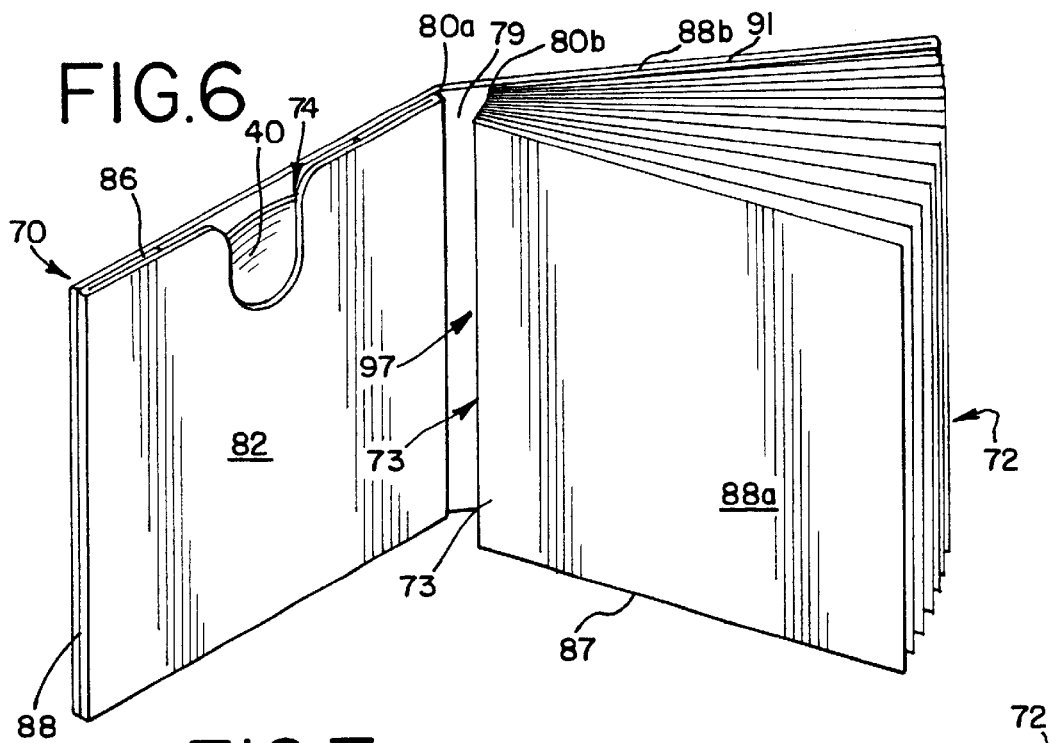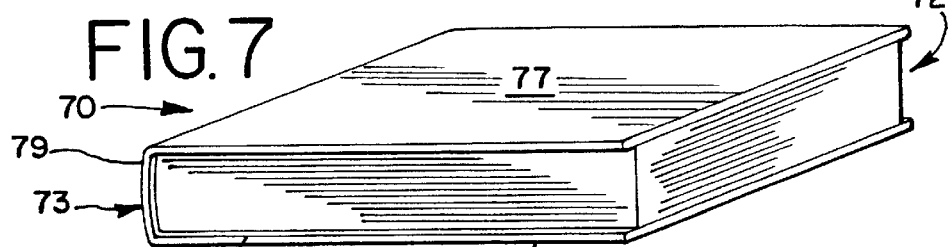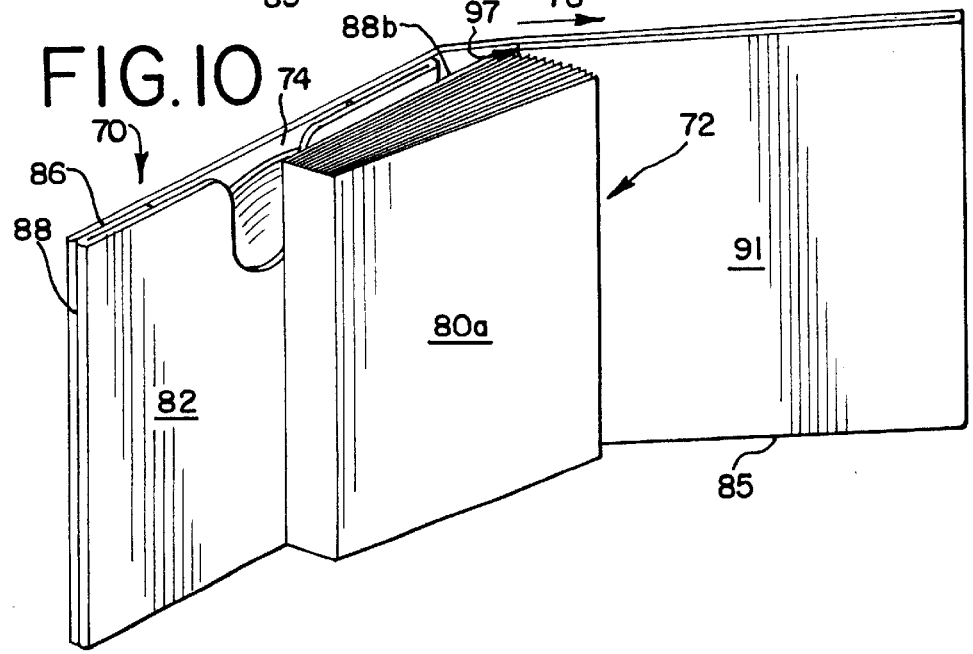

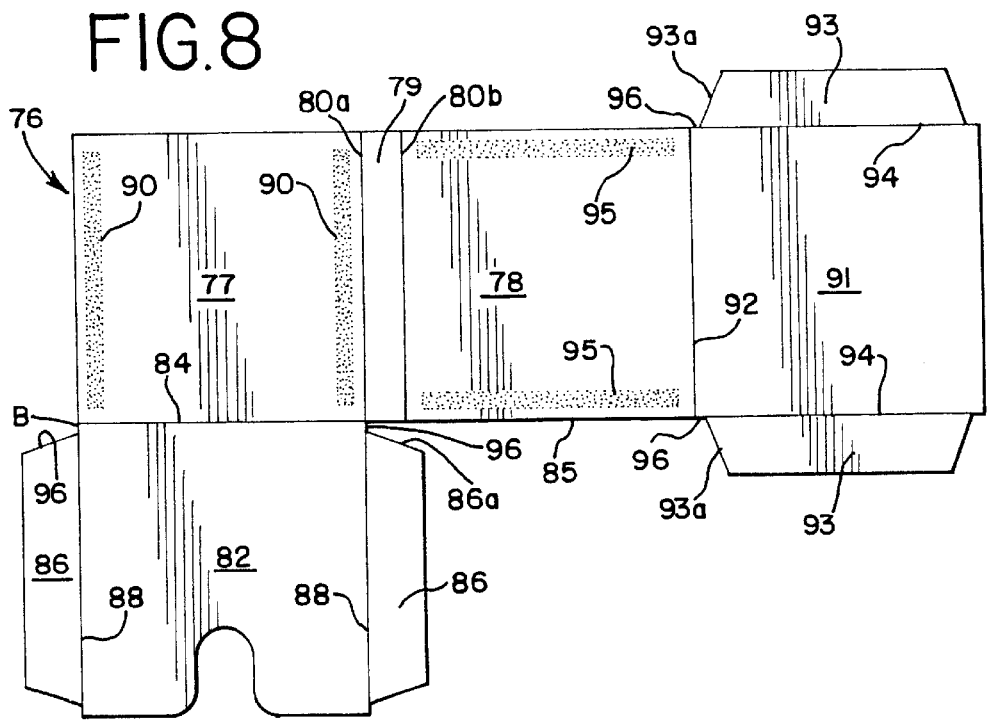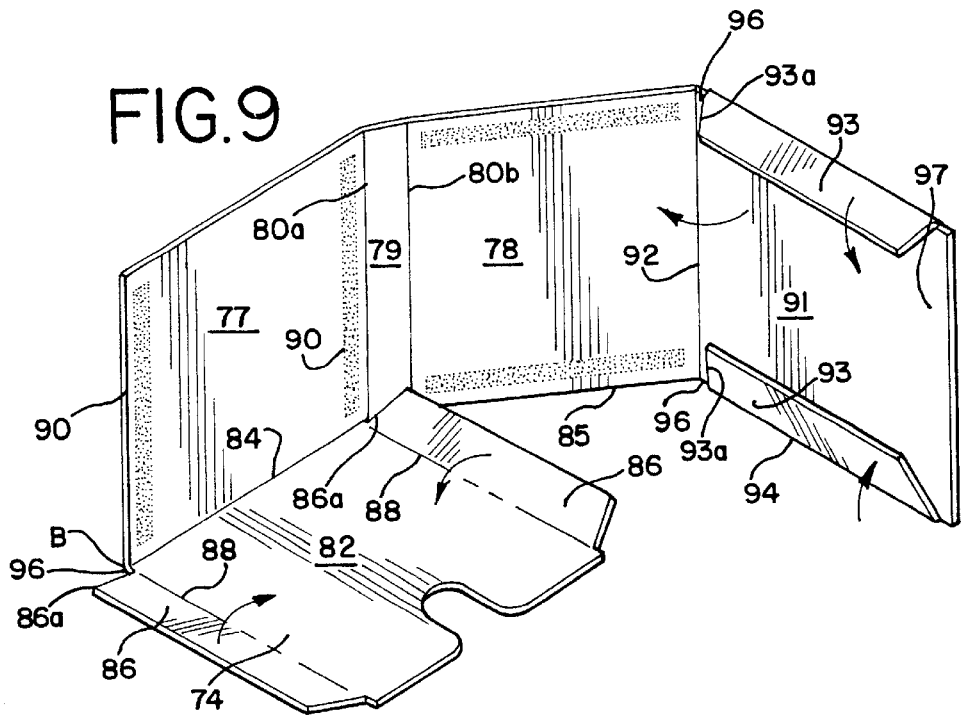

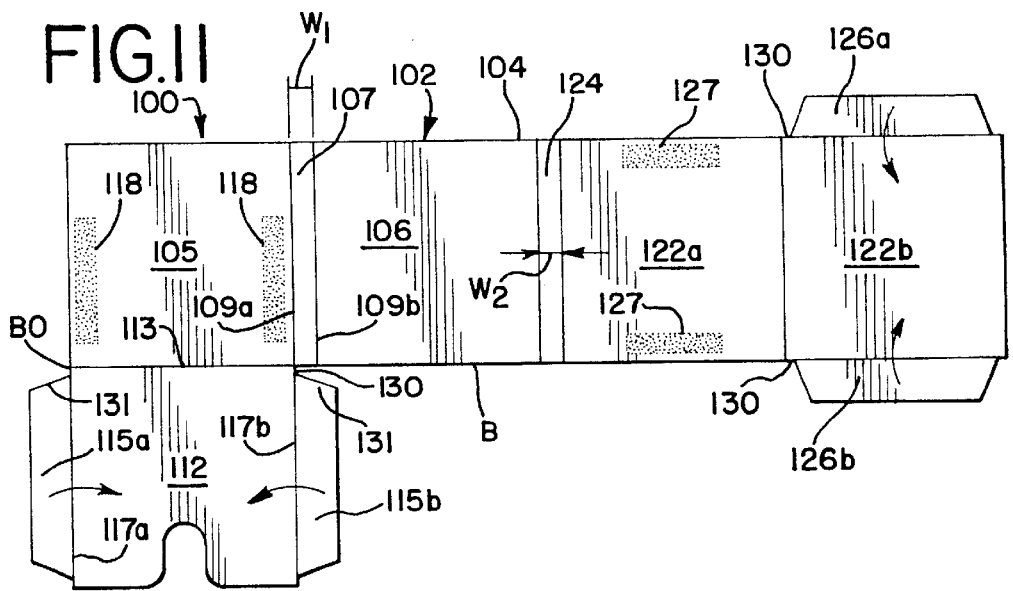
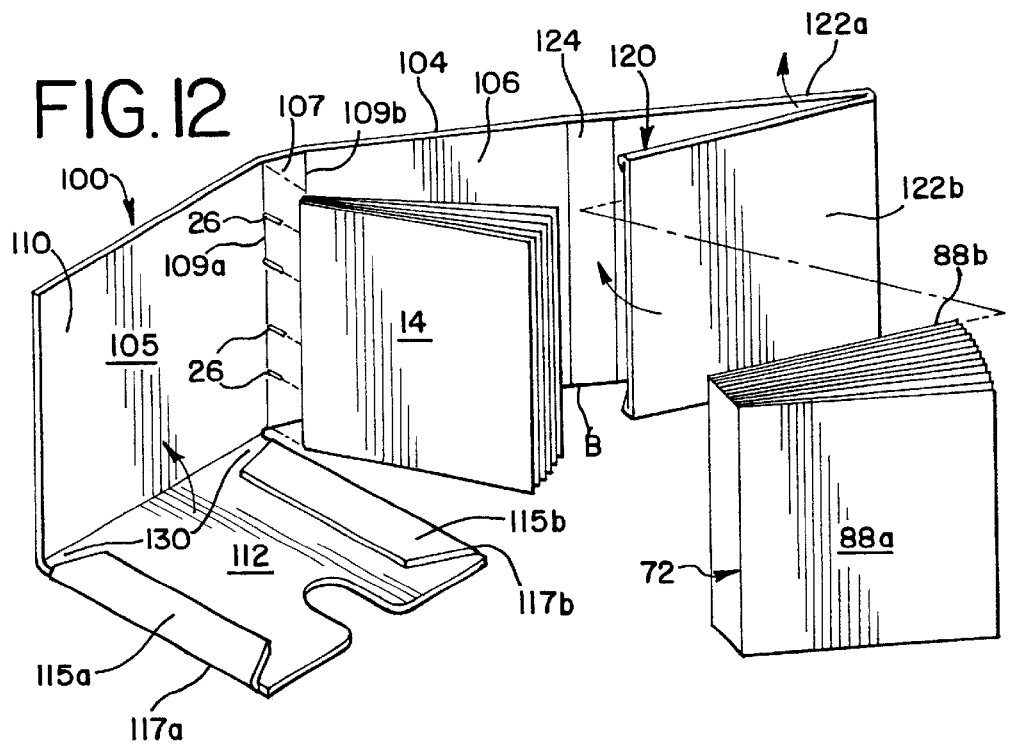

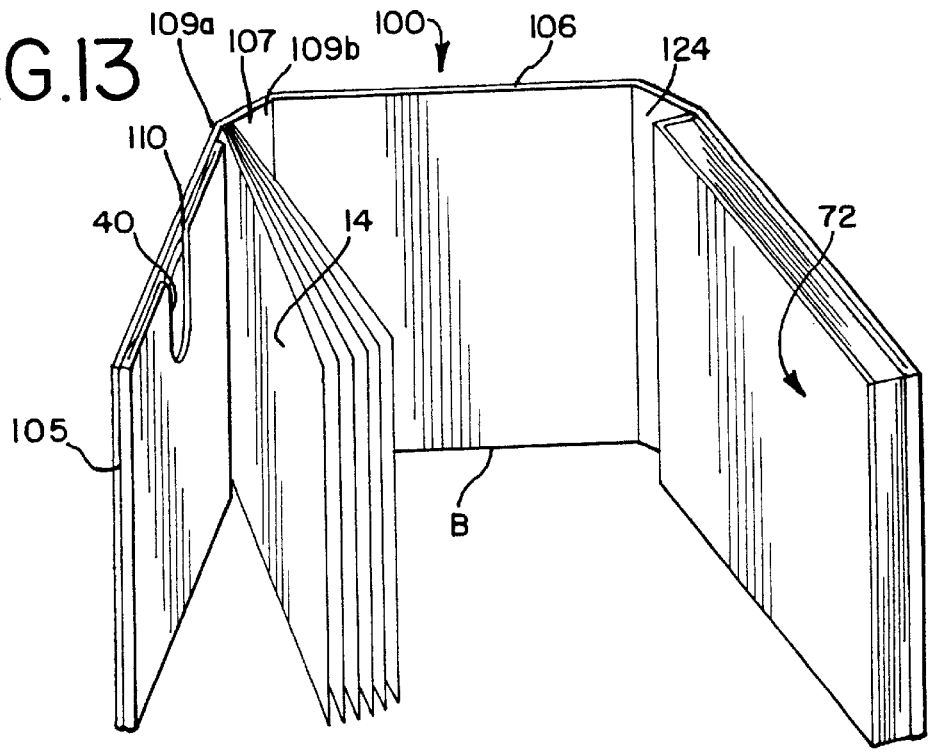
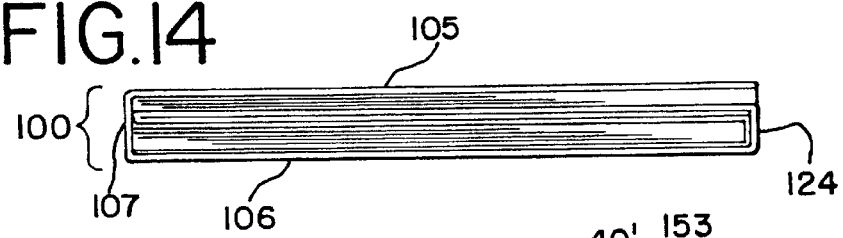
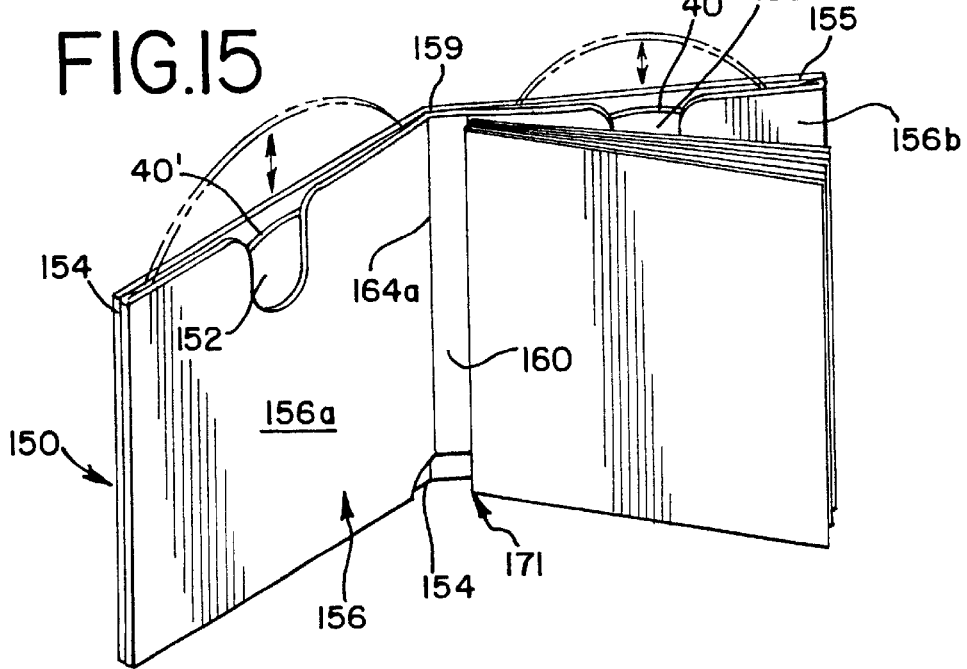

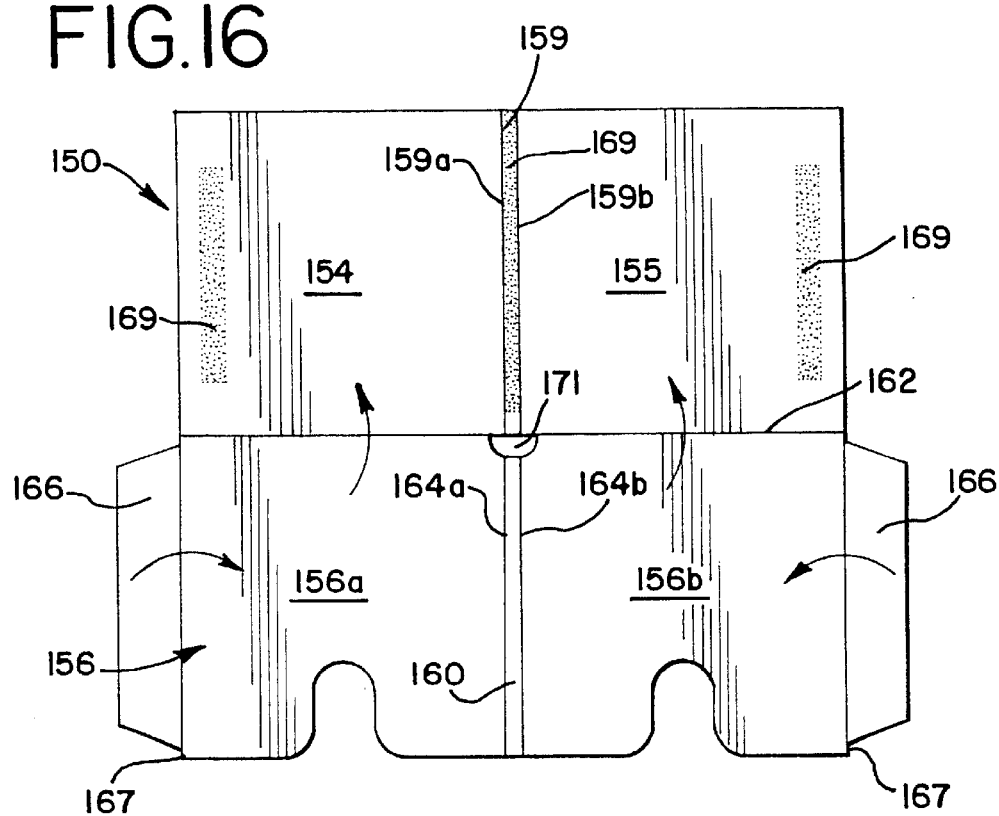
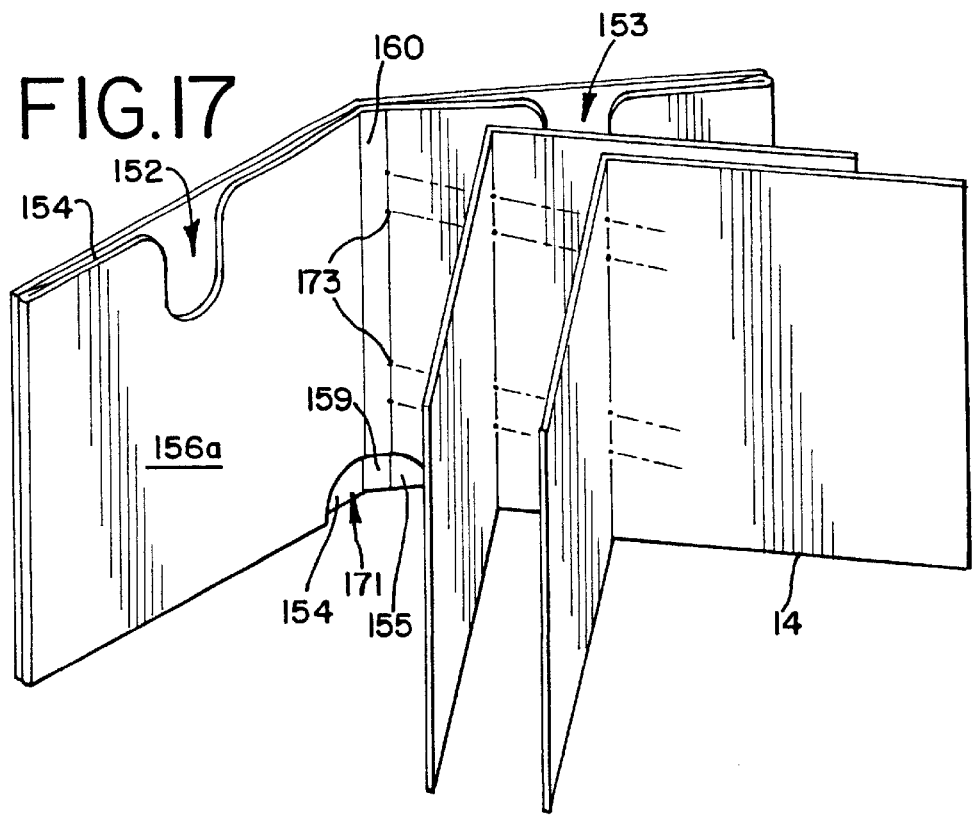

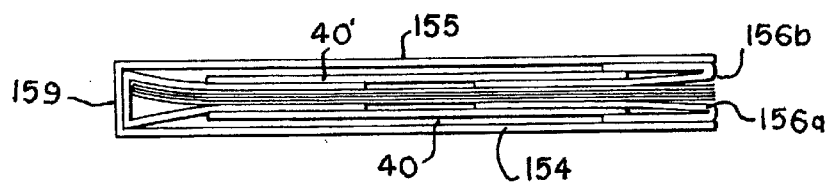
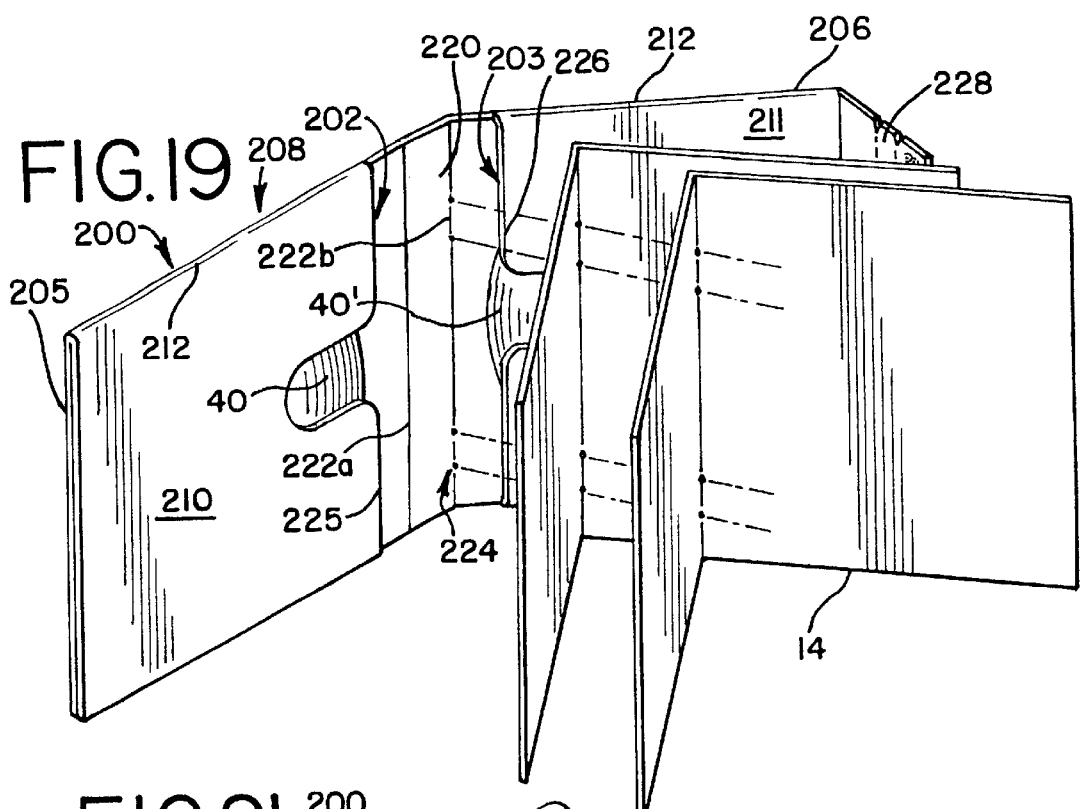
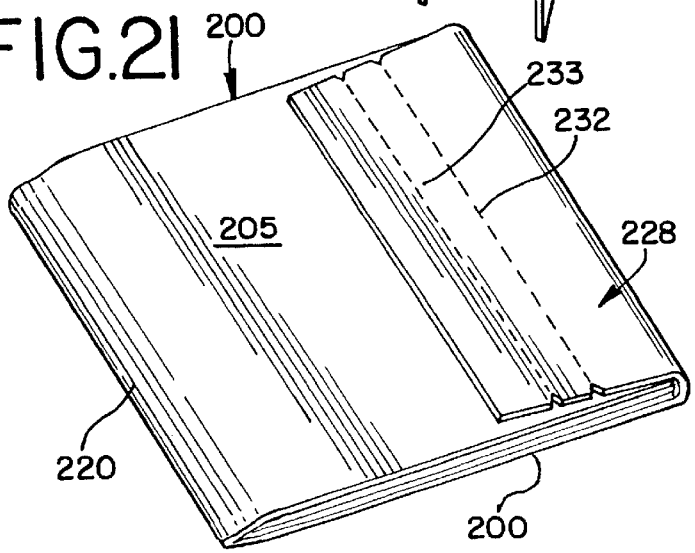

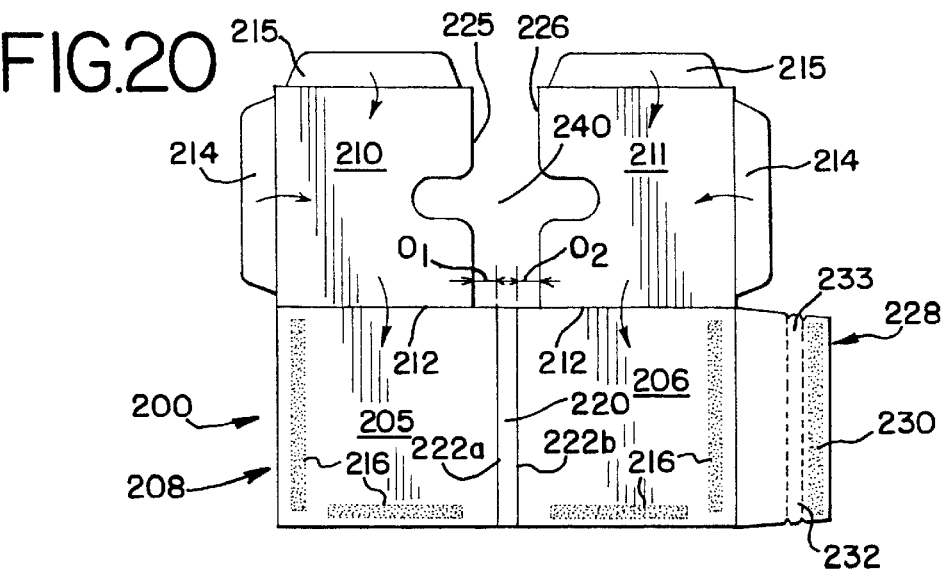
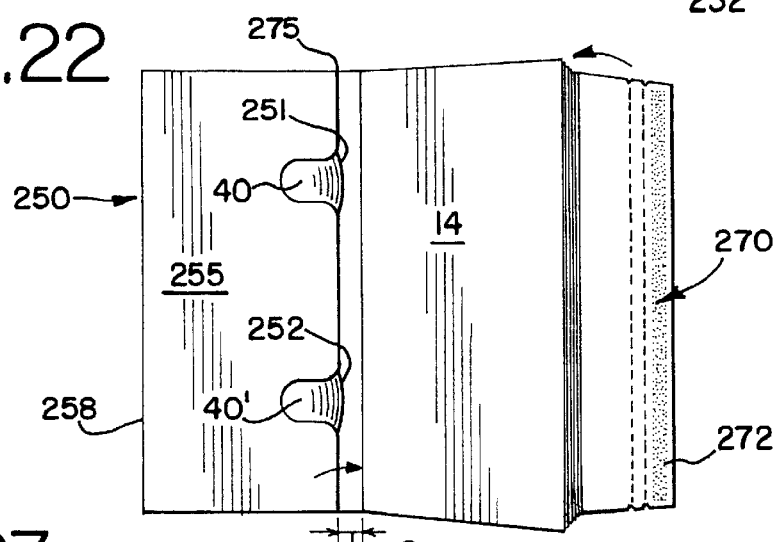
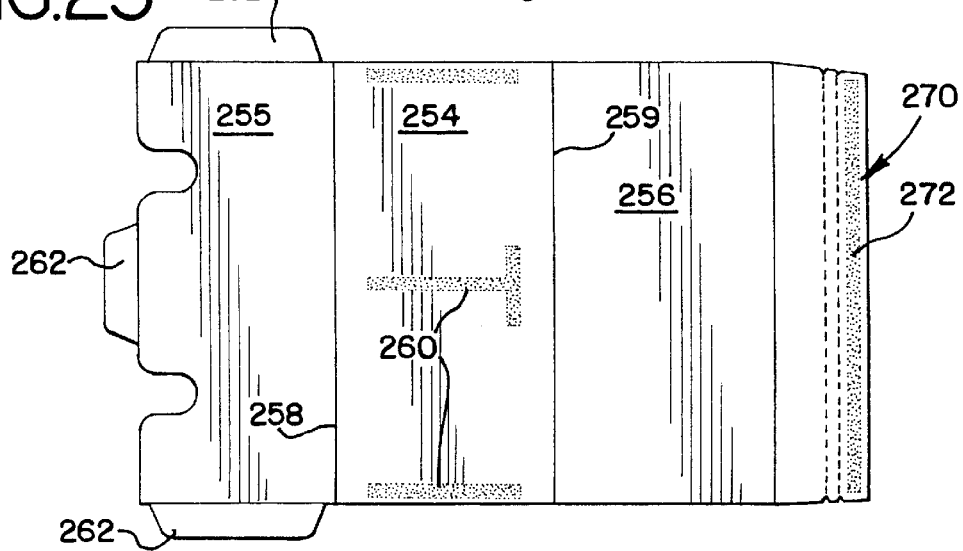

COMPACT DISC FOLDER BOOKLET

REFERENCE TO RELATED APPLICATION

This application is a continuation-in-part application of my prior U.S. patent application Ser. No. 08/753,221, filed Nov. 21, 1996, now U.S. Pat. No. 5,669,491.

BACKGROUND OF THE INVENTION

The present invention relates generally to holders for compact discs and, more particularly, to compact discs holders having printed information that accompanies the compact disc.

Compact discs are used to store both digitally recorded music and computer programming information. The use of compact discs for computer programming has risen dramatically over the past few years and this use will likely increase because of the ability to store an enormous amount of data on a compact disc.

Audio compact discs, i.e., those containing prerecorded music, are typically stored in plastic containers known in the trade as "jewel boxes." Jewel boxes utilize front and rear plastic panels that are hinged together along adjacent edges. Although the jewel box is an effective storage device for compact discs, it is not recyclable and it is prone to breakage when sent through the mail.

Furthermore, jewel boxes are bulky compared to the thin compact disc stored therein. Manufacturing costs for the jewel box are also relatively high. The plastic jewel box is not easily printed on and any printed information accompanying the compact disc is enclosed in the box and positioned to show through the jewel box. As such, the manufacturing expense includes not only the plastic, molding and assembly costs for the jewel box but also the printing and paper costs for the inserts. The size of the jewel box limits the amount of printed matter that can accompany the compact disc. Small information booklets are either enclosed in the jewel box or held within a recess on the back of the jewel box. Removal of such booklets is awkward.

Software compact discs, i.e., those containing computer program information are known in the art as CD-ROMS. These types of compact discs also are typically stored in plastic jewel boxes. Often, a program manual accompanies the compact disc that is significantly thicker than the jewel box itself. This requires an additional package to enclose both the program manual and the jewel box containing the compact disc. Quite often, an end user will misplace either the manual or the jewel box.

There have been attempts to provide compact disc holders that overcome the disadvantages of the jewel box. These holders are formed from paper, such as those disclosed in U.S. Pat. No. 5,085,318. Although compact, this compact disc holder provides little room for printed information and any such information must be printed on the front and back covers only. U.S. Pat. No, 5,154,284 discloses a compact disc holder that uses one large, single sheet of paper that is folded accordion-style in a map-like fashion for storage within the CD holder. Opening and refolding the printed material is awkward and the number of folds increases the cost of the holder. The compact disc holders and packages of the prior art do not provide any compact disc carrier that also provides for the accompaniment of a thick manual. Additionally, the prior art is without a secure mailer for transmitting compact discs and program booklets in an inexpensive, secure and reliable manner.

The present invention is directed to a compact disc folder which overcomes the disadvantages of the aforementioned prior art.

Accordingly, it is a general object of the present invention to provide a compact disc folder in the form of a booklet having distinct cover and booklet portions and which holds a compact disc in an internal pocket as well as printed text or instructions.

Another object of the present invention is to provide a compact disc paged carrier for holding a compact disc and providing a suitable amount of printed information with the compact disc.

Yet another object of the present invention is to provide a compact disc folder in the form of a booklet having a relatively rigid cover portion that encloses a disc-receiving pocket and a text portion having multiple pages, the pages being integrated into the booklet and attached to the cover portion thereof.

Still another object of the present invention is to provide a compact disc folder for holding a compact disc and for holding a booklet accompanying the compact disc that is several times thicker than the compact disc.

A still further object of the present invention is to provide a compact disc folder in the form of a booklet, the booklet having a cover portion that has a disc-receiving pocket integrally attached equally formed therewith in the interior of the booklet, the booklet having a text portion disposed in the interior of the booklet adjoining the disc-receiving pockets.

Yet another object of the present invention is to provide a compact disc folder booklet that encloses a compact disc and an accompanying booklet in a secure manner so that the folder booklet may also function as a mailer that encloses the compact disc in a disc-receiving pocket and an informational booklet of approximately the same thickness as the compact disc, the manual and disc-receiving pocket adjoining each other when the folder is closed.

SUMMARY OF THE INVENTION

In one aspect, the present invention is directed to a compact disc folder having a cover portion made from a paperboard blank having distinct front and rear panels interconnected by a vertical foldline. A pocket is formed on an interior surface of the front panel and overlies, when the folder is closed, a multiple page booklet portion held between the front and rear panels. The pages of the booklet portion have centerlines that are aligned with the first foldline of the folder.

In another aspect of the present invention, the folder includes a pocket panel attached to the front panel along a second foldline arranged generally perpendicular to the first foldline. The pocket panel is attached to the front panel by way of attachment flaps which are glued to the front panel along opposing side edges so that the pocket panel overlies the front panel. The flaps are of a length less than a corresponding length of the front panel side edges they are attached to so that the pocket lies flat upon the front panel and doesn't bulge upwardly to cause interference with closing of the folder.

In still another aspect of the present invention, at least one of the flaps includes a notch formed between it and the front and rear panels of the cover portion. This notch permits the one flap to be folded upon the pocket panel along a line that is offset from the first foldline of the cover portion, thereby also ensuring that the folder as a whole will lie flat when in a closed position and also ensuring that the pocket does not interfere with the attachment of the booklet pages to the cover portion.

In another principal aspect of and as exemplified by a second embodiment of the present invention, the compact disc folder includes a cover portion having front and rear panels interconnected by an intervening spine panel and, a first pocket panel extends from the front panel and is folded upon the interior of the front panel to form a disc-receiving pocket. A second pocket panel extends from the rear panel and is folded upon the interior of the rear panel to form a side-load pocket that receives the rear cover of a thick booklet. The intervening spine panel permits the front and rear panels to be folded together so that they lie flat together without bulging to cause interference with the closing of the folder.

In still yet another principal aspect and as exemplified by another embodiment of the present invention, either the cover or rear portions of the folder may have a securement flap extending therefrom that folds on the open end of the folder and attaches to an opposing panel so that the folder forms a secure enclosure. The securement flap may have lines of weakening formed therein to permit a user to open the folder.

In yet a further principal aspect of the present invention and as demonstrated by yet another embodiment of the invention, a dual compact disc folder, or carrier, is provided with first and second disc-receiving pockets formed on the interior portions of the front and rear cover portions. This folder embodiment is formed from a single blank that is folded once upon a first foldline to define the disc-receiving packets of the front and rear cover portions and secondly upon a second foldline that intersects the first foldline to thereby define the front and rear cover portions. In the rear where the first and second foldlines meet, an opening is provided in the blank to eliminate the need for a gusset and to ensure that the folder as a whole will be flat in a closed position.

These and other objects, features and advantages of the present invention will be clearly understood through consideration of the following detailed description.

BRIEF DESCRIPTION OF THE DRAWINGS

In the course of the following detailed description, reference will be frequently made to the accompanying drawings in which:

FIG. 4 is a plan view of a blank used in constructing the cover portion of the compact disc folder of FIG. 1; and, FIG. 5 is a perspective view of the blank of FIG. 4 in a partially-folded condition, illustrating the initial steps in constructing the cover portion thereof.

FIG. 6 is a perspective view of a second embodiment of a compact disc folder constructed in accordance with the principles of the present invention;

FIG. 7 is on end perspective view of the compact disc folder of FIG. 6 lying flat on its rear cover and illustrating the size of the booklet the folder may accommodate;

FIG. 8 is a plan view of a blank used in constructing the cover portion of the compact disc folder of FIG. 6;

FIG. 9 is a perspective view of the blank of FIG. 8, in a partially-folded condition, illustrating the initial steps in constructing the cover portion compact disc folder of FIG. 6;

FIG. 10 is a perspective view of the blank of FIG. 9 in an assembled condition, illustrating how a relatively thick, paged booklet is inserted therein;

FIG. 11 is a plan view of a blank used in forming a cover portion for another embodiment of a compact disc folder constructed in accordance with the principles of the present invention;

FIG. 12 is an exploded perspective view of the folder blank of FIG. 11 showing the steps of assembly thereof;

FIG. 13 is a perspective view of the assembled compact disc folder, but in an open condition;

FIG. 14 is an end view of the compact disc folder of FIG. 13 in an closed condition;

FIG. 15 is a perspective view of a fourth embodiment of a compact disc holder constructed in accordance with the principles of the present invention;

FIG. 16 is a plan view of a blank used to form the cover portion of the compact disc folder of FIG. 15;

FIG. 17 is an exploded view of the compact disc folder of FIG. 15;

FIG. 18 is an end view of the compact disc folder of FIG. 15;

FIG. 19 is an exploded perspective view of a fifth embodiment of a compact disc folder constructed in accordance with the principles of the present invention;

FIG. 20 is a plan view of a blank used to construct the cover portion of the compact disc folder of FIG. 19;

FIG. 21 is a perspective view of the compact disc folder of FIG. 19 in a closed condition, illustrating the securement flap attached to the front cover portion of the folder;

FIG. 22 is a top plan view of a sixth embodiment of a compact disc folder constructed in accordance with the principles of the present invention open position; and, FIG. 23 is a plan view of a blank used in forming the cover portion of the compact disc folder of FIG. 22.

DETAILED DESCRIPTION OF THE INVENTION

Figure 1:
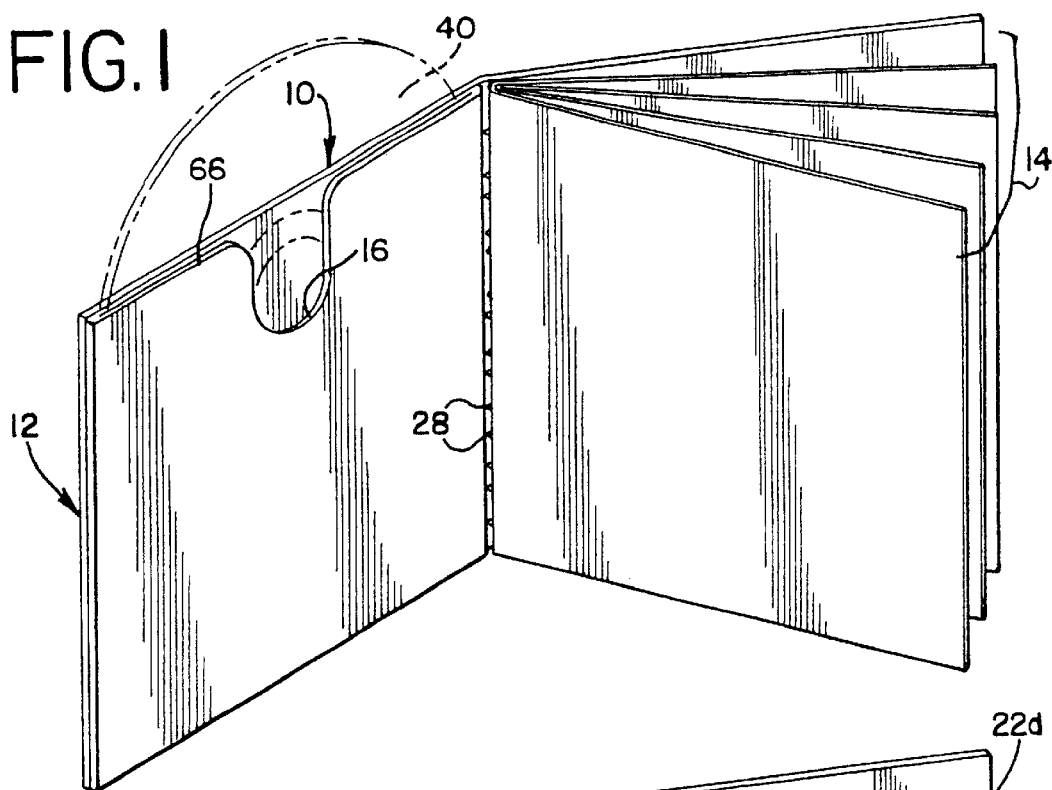
FIG. 1 is a perspective view of one embodiment of a compact disc folder constructed in accordance with the principles of the present invention.

Referring to FIG. 1, a compact disc folder constructed in accordance with the principles of the present invention is illustrated generally at 10. The folder 10 takes the form of a booklet and includes an outer cover portion 12, an internal multiple page portion 14 and a compact disc-receiving pocket 16. The cover portion 12 may be easily formed from a single blank 20 of paperboard or another relatively rigid material. (FIG. 4.)

The page portion 14 of the folder 10 includes multiple pages 22a, 22b, 22c & 22d that are folded around a central, common foldline 24 thereof. The page portion 14 preferably includes multiple pages in groups of two pages, such as 22a & 22b and 22c & 22d. Any number of pages may be used in constructing the page portion 14. The page portion 14 may be attached to the cover portion 12 of the folder by any suitable means, such as by staples 26, as illustrated in FIG. 3, or by stitching 28, as illustrated in FIGS. 1 & 2.

Turning now to the specific details of the cover portion 12, and with particular reference to FIGS. 4 & 5, it can be seen that the cover portion 12 is formed from a single blank 20. The cover portion 12 includes a front panel 32 defined thereon which serves as the cover of the folder 10, a rear panel 34 defined thereon which serves as the back of the folder 10 and an interior pocket panel 36 defined thereon which serves to form the disc-receiving pocket 16 that holds the compact disc 40, shown in phantom, therein.

Figure 2:
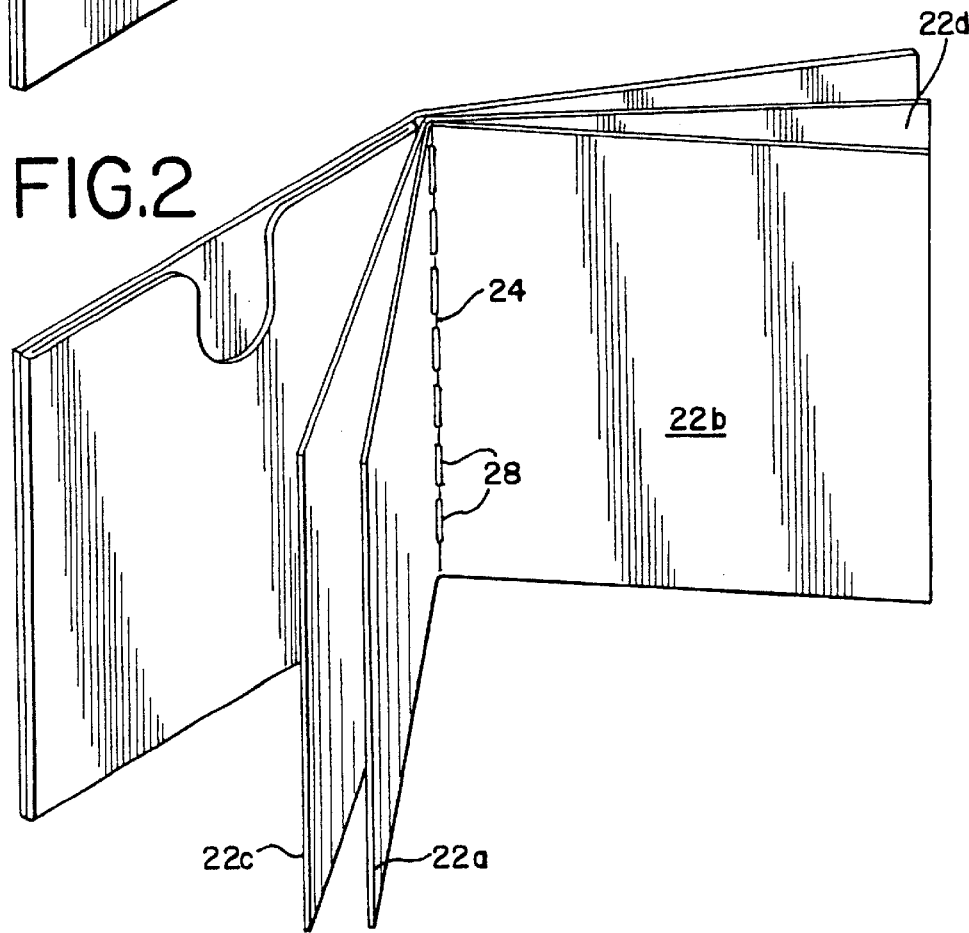
FIG. 2 is the same view as FIG. 1, but showing the booklet portion thereof in an open position.
Figure 3:
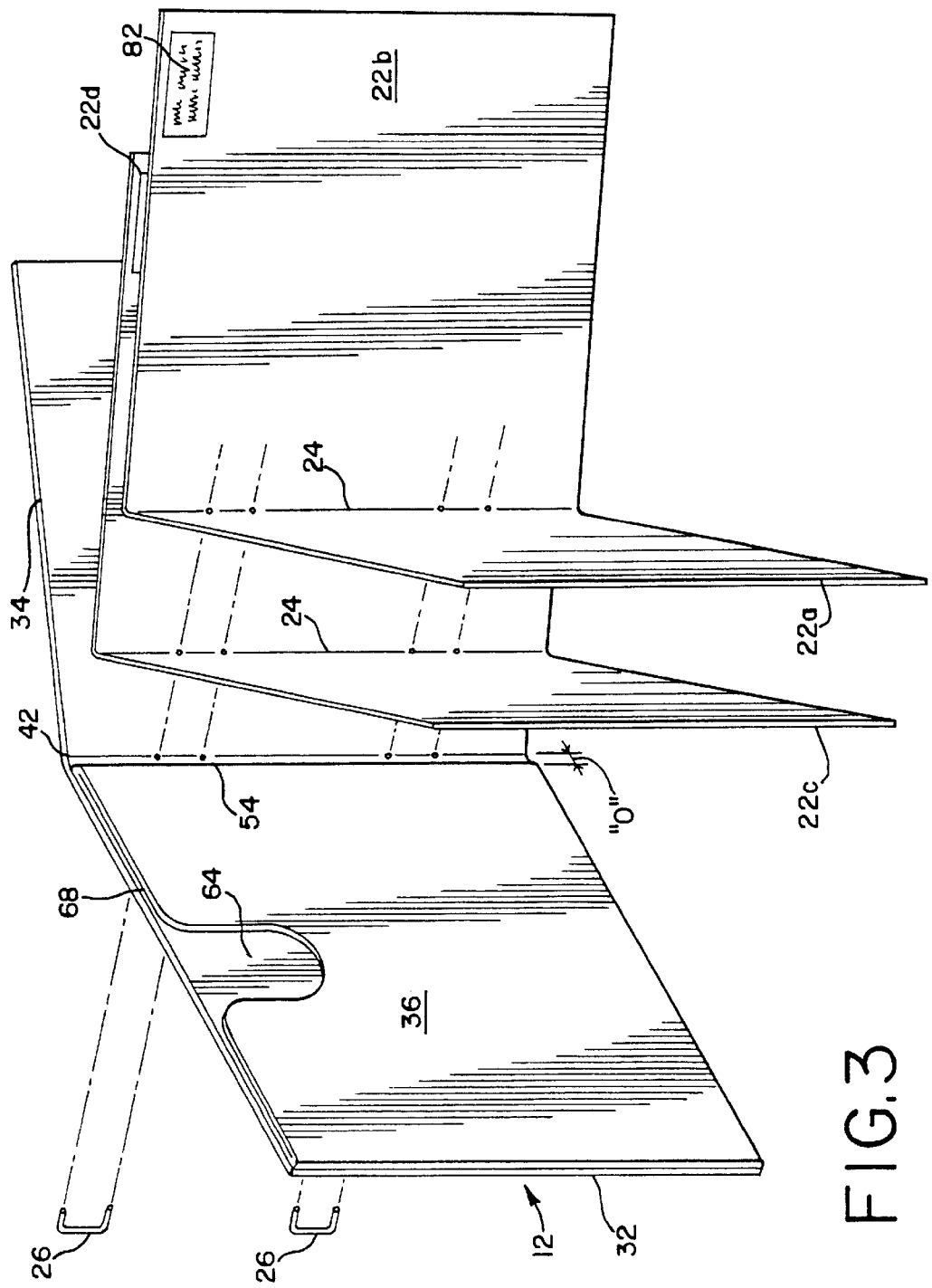
FIG. 3 is an exploded view of the compact disc folder of FIG. 1.

The front panel 32 and the rear panel 34 are interconnected to each other along common opposing edges that meet at an intervening foldline 42 which has a vertical orientation when the folder 10 is in an upright position such as illustrated in FIGS. 1–3. The interior panel 36 is interconnected to the front panel 32 along common opposing edges that meet at an intervening second foldline 44 that assumes a horizontal orientation when the folder 10 is in its upright position. The second foldline 44, as indicated in the Figures, is angularly offset from the foldline 42 and is preferably generally perpendicular thereto. The front panel 32 has two pairs of side edges 45a –45d that define its dimensions and extent. Two of these side edges 45a, 45b are located along the top and bottom edges of the front panel 32, while the remaining two side edges 45c, 45d define the sides of the front panel 32 and interconnect the top and bottom side edges 45a, 45b together.

The interior panel 36 that forms the pocket 16 in cooperation with the front panel 32 of the folder 10 includes two attachment panels, or flaps 46, 48, that are interconnected to the interior panel 36 along two opposing side edges 49a, 49b thereof. The flaps 46, 48 are separated from the interior panel 36 by intervening third and fourth foldlines 50, 52 that extend generally parallel to the foldline 42.

In an important aspect of the present invention, the third foldline 50 is slightly offset from the foldline 42 that separates the front and rear panels 32, 34. This offset is indicated at "O" in FIG. 4. The third foldline 50 defines the right side edge 54 of the interior panel 36 and of the disc-receiving pocket 16. The offset keeps the right side edge 54 of the pocket away from the center of the folder 10 and away from the foldline 42 to permit alignment of the page centerlines 24 with the foldline 42. This offset also permits the folder to lay substantially flat when in a closed, folded position, wherein the front panel is folded upon the rear panel 34 with the pages 22a –22d held therebetween.

In order to facilitate assembly of the pocket 16, at least one flap 50, and preferably both flaps 50, 52 have lengths that are less than the lengths of the side edges 49a, 49b of the interior panel 36. This dimensional relationship is preferably accomplished for the one flap 50 by way of a notch 54 interposed between the end 55 of the flap 50 and the bottom side edge 45b of the front panel 32 and the bottom side edge 80 of the rear panel 34. The notch 54 can be seen to terminate past the first foldline 42 and adjacent the front panel 32 along the bottom side edge 45b thereof. The notch further terminates at the third foldline 50 to ensure that the offset "O" is not compromised.

Adhesive is used to attach the flaps 50, 52 to the inner surface 60 of the front panel 36. The adhesive is preferably a permanent adhesive and is applied to either the front panel inner surface 60 in strips or beads 62, as illustrated, or it may be applied to the flaps 50, 52 themselves. The interior panel may further include a cutout 64 extending from one side edge 66 thereof which lies adjacent the opening 68 of the pocket 16. This cutout 64 extends inwardly a sufficient extent top permit a user to reliably grab hold of the compact disc 40 when it is retained within the pocket 16.

In assembling the folders 10 of the present invention, the blank 20 may be die-cut from a sheet of paperboard, and the flaps 50, 52 folded about their respective foldlines 49a, 49b as illustrated in FIG. 5. The interior panel 36 is thereupon folded onto the front panel 32 around foldline 44. The page portions 14 are then attached to the cover portion 12 by saddle stitching, stapling or any other suitable means, such as gluing along the foldline 42. This construction permits the pages to be numbered with individual serial numbers in designated areas 20 for promotional and ordering purposes during the printing of the pages prior to assembly into the cover portion 12.

FIGS. 6–11 illustrate a second embodiment of a compact disc folder 70 constructed in accordance with the principles of the present invention. The folder 70 generally differs from the first embodiment 10 shown in FIGS. 1–5 in that it contains a relatively "thick" booklet 72 that is held within a booklet-receiving pocket 97 of the folder 70 so that the booklet 72 lies adjacent to the compact disc 40 held within a disc-receiving pocket 74, when the folder 70 is closed. Each of these pockets 74, 97 are interior pockets, that is they are accessible when the folder 70 is opened.

As illustrated best in FIG. 8, the folder 70 includes a cover portion 75 that is formed from a single blank 76 of suitable material, such as paperboard. (FIG. 11.) The blank 76 includes a front cover panel 77 and a rear cover panel 78. These two cover panel 77, 78 are interconnected by an intervening spine panel 79 having a width W that is approximately equal to or slightly greater than the thickness T of the booklet 72. This spine panel 79 is defined by a pair of first foldlines 80a, 80b that extend parallel to each other and define the spine 73 of the booklet 72.

The first pocket 74 that accommodates one compact disc 40 is formed by a first interior pocket panel 82 that is attached to the front cover panel 77 and separated therefrom by a second foldline 84. This foldline 84 may, as illustrated in FIG. 8, lie coincident with the bottom edge 85 of the rear cover panel 78 and the baseline B of the folder 70. The second foldline 84 also runs perpendicular to the first foldlines 80a, 80b and intersects at least one 80a of them. The pocket panel 82 may include attachment flaps 86 formed therewith which are separated from the pocket panel 82 by foldlines 88. The flaps 86 are folded upon the pocket panel 82 as shown in FIG. 9 and are attached to the interior surface of the front cover panel 77 by a suitable means such as self-adhesive tape or hot-melt glue strips 90 or other type of adhesive.

The second pocket 97 of the folder 70 does not receive a compact disc, but rather receives the booklet 72. The second pocket 97 is formed from a second interior pocket panel 91 that is attached to the rear cover panel 78 and separated therefrom by a third foldline 92. This foldline 92 extends generally parallel to the first foldlines 80a, 80b that define the spine panel 79. One or more attachment flaps 93 are defined by respective foldlines 94 in the second pocket panel 91 and permit the second pocket panel to be attached to the rear cover panel 78. An adhesive means such as glue strips 95 may be deposited either on the interior surface of the rear cover panel 78 as illustrated or may be applied to the flaps 93 themselves to complete the forming of the second pocket 97 for the folder 70.

In order to facilitate assembly of the two interior pockets 74, 97 at least one of the flaps 86, 93 of the two pocket panels 82, 19 proximate to the baseline B (represented by the dark horizontal line in FIG. 8) has a length that is less that the respective foldlines 88, 94 that separate them from their associated pocket panels 82, 91. This dimensional relationship is preferably accomplished by way of interposing a notch 96 between the one flap 86 and the baseline B or by removing the beginning edges 86a, 93a of the flaps 86, 93 from the baseline B. The spacing defined by the notch 96 ensures that the flaps 86, 93 do not interfere with the folding of the pocket panels 82, 91 during assembly of the folder blank 76 and further ensures that the pocket panels 82, 91 will generally lie flat when assembled.

In assembling this embodiment, the blank 76 may be die cut from a sheet of paperboard and the various panels 77, 78, 79, 82, 91 and their associated flaps 86, 93 are defined by forming the various foldlines 80, 88 & 92. The first pocket panel 82 may have its flaps 86 folded upon itself and the pocket panel 82 folded about foldline 84 onto the interior surface of the front cover panel 77 and into contact with the adhesive 90 to define the disc-receiving pocket 74. The second pocket panel flaps 93 are then folded and the pocket panel 91 folded upon and adhered to the interior surface of the rear cover panel 78 at adhesive areas 95 to form the booklet-receiving pocket 97.

The booklet 72 then is inserted into the pocket 96 defined by the rear pocket panel 91. The booklet 72 itself preferably includes a relatively rigid cover 87 with distinct front and rear cover flaps 88*a*, 88*b*. The rear cover flap 74*b* is inserted into the rear pocket 97 formed between the second pocket panel 91 and the rear cover panel 78. If necessary, either the rear cover panel 78 or the booklet rear cover flap 74*b* may have a pressure-sensitive adhesive deposited thereon to assist the rear pocket to retain the booklet 72 in place. A compact disc 40 is inserted into the front panel pocket and the two cover panels 77, 78 are then folded onto each other to arrive at a desired square or rectangular booklet shape depicted in FIG. 7. When closed, the spine panel 79 forms a spine or backbone of the finished folder 70.

FIGS. 11–14 illustrate a third embodiment of a compact disc folder 100 constructed in accordance of the principles of the present invention. The folder 100, as best shown in FIG. 13 accommodates a compact disc 40 and a thick booklet 72 which may contain programming information in instances where the compact disc 40 is a CD-ROM or artist biographical information in instances when the compact disc 40 is a music compact disc. This folder 100 may also contain a smaller booklet portion 14 to provide additional printed information. In forming the folder 100, a blank 102 is die cut to form a multiple panel cover portion 104 of the folder 100. (FIG. 11.) The cover portion 104 has distinct front and rear panels 105, 106 that are interconnected by a first intervening spine panel 107 which is set apart from the front and rear panels 105, 106 by foldlines 109*a*, 109*b*. These foldlines 109*a*, 109*b* are oriented parallel to the baseline B of the folder.

A disc-receiving pocket 110 is formed in the folder 100 between the front cover panel 105 and a first interior panel 112 that lies adjacent to the front cover panel 105. The front cover panel 105 is separated by a second foldline 113 from the interior panel 112 and a pair of attachment flaps 115*a*, 115*b* interconnected to the thereto along respective foldlines 117*a*, 117*b* that are also angularly offset from the baseline B. As shown in FIG. 12, these flaps 115*a*, 115*b* are folded upon the first interior panel 112 and then adhered to the interior surface of the front cover panel 105 by way a suitable adhesive means 118 applied to either the front cover panel 105 or the interior panel flaps 115*a*, 115*b*.

A second pocket 120 of the folder is formed to receive the rear cover flap 88*b* of the booklet 72. This second pocket 120 is formed from two adjoining interior second pocket panels 122*a*, 122*b* which are interconnected to the rear cover panel 106 by a second intervening spine panel 124. One of the two second pocket panels 122*b* may include one or more attachment flaps 126*a*, 126*b* disposed thereon to provide a means for attaching the two panels 122*a*, 122*b* together using adhesive 127 or the like.

The booklet rear flap 88*b* is held within the booklet-receiving pocket 120 in the manner above described for the second embodiment 70. An additional, multiple-page booklet 14 may be supported on the cover portion 104 along one of the foldlines 109*a* that define the spine panel 107 in a suitable manner such as by saddle stitching or by the use of staples 26. The two spine panels 107, 124 permit the second pocket panel 122 and the front cover panel 105 to be folded over the rear cover panel 106 and each other in the manner shown in FIG. 14. In this regard, it is desirable that two spine panels 107, 124 have about the same widths $W_1$, $W_2$ so the folder 100 will assure a flat booklet shape as illustrated in FIG. 14. In order to compensate for the additional thickness of the folder 100 caused primarily by the additional booklet 14, the width $W_1$, of the first spine panel 107 may be slightly greater than the width $W_2$ of the second spine panel 124.

As with the folders previously described, notches 130 may be formed between the attachment flaps 115*a*, 115*b* and the nearest foldline 113 that separates the flaps 115*a*, 115*b* from an adjoining cover panel 105. The notches 130 may be die cut separately or formed by spacing the beginning edges 131 of the flaps 115*a*, 115*b* apart from their associated foldline 113. Similar notches are in effect formed on the attachment flaps 126*a*, 126*b* of the second pocket panels 122*a*, 122*b*. The use and location of these notches 130 permits the two pockets 110, 120 and the booklets 14, 72 to lie substantially flat when the folder 100 is in a closed position as shown in FIG. 14.

FIGS. 15–18 illustrate a fourth embodiment of a compact disc folder 150 constructed in accordance with the principles of the present invention. This folder embodiment 150 includes a cover portion 151 that accommodates two compact discs 40, 40' in respective first and second disc-receiving pockets 152, 153 that are cooperatively defined between respective front and rear panels 154, 155 and an interior pocket panel 156. As shown in the blank 158 of FIG. 16, the front and rear panel 154, 155 are preferably interconnected together by an intervening panel 159 that is defined by two parallel foldlines 159*a*, 159*b*.

A single interior pocket panel 156 having distinct first and second portions 156*a*, 156*b* and a central portion 160 is attached to the front and rear panels 154, 155 along a second foldline 162 that forms a baseline B of the completed folder 150. This second foldline 162 extends perpendicularly to the foldlines 159*a*, 159*b* that define the spine panel 158 and intersect therewith. The two parallel foldlines 159*a*, 159*b* are preferably coincident with a like pair of foldlines 164*a*, 164*b* that define the central portion 160 of the interior pocket panel 156. The interior pocket panel 156 may include one or more flaps 166 disposed at the outer edges 167 thereof in order to attach the pocket panel 156 to the front and rear cover panels 154, 155. Adhesive 169 is deposited on appropriate surfaces of the folder 150, shown in FIG. 16 as along the outer edges 170 of the front and rear panels 154, 155 and preferably along the intervening portion 159. It will be understood that the adhesive may also be placed on the flaps 166 or pocket panel 156 and the same results achieved.

In assembly of the folder 150, the blank 158 is die-cut and the flaps 166 folded onto the pocket panel 156 and the various foldlines are formed. The pocket panel 156 is folded around the second foldline 162 onto the front and rear panels 154, 155 so that the adhesive 169 holds them together. In order to ensure that the folder will lie flat when in a closed position, such as shown in FIG. 18, and in order to prevent the formation of an unsightly bulge, or gusset, at the intersection of the foldlines 159*a*, 159*b* and 162, the interior pocket panel is provided with an opening, illustrated as a notch 171. This opening 171 is positioned adjacent the base foldline 162 and extends into the first and second portions 156a, 156b of the pocket panel 156. This notch 171 prevents the interior panel 156 from buckling and forming an inadvertent gusset that would tend to cause a bulge at the middle of the cover panels 154, 155. This bulge would prevent the folder 150 from lying flat while closed.

This folder 150 also contains a multiple page booklet 14. The booklet is supported on the cover portion 151 along one of the central foldlines 159a, 159b in a conventional manner such as by adhesive, staples or saddle stitching 173 as illustrated in FIG. 17. The central panels 159, 160 of the cover portion 151 are preferably wide enough to accommodate the booklet 14 in a manner so that the folder 150 will lie substantially flat when closed. (FIG. 18)

FIGS. 19–21 illustrate yet a fifth embodiment of a compact disc paged carrier 200 that is a variant of the fourth embodiment 150 and that is particularly suitable for use as a mailer. The carrier 200 also contains two compact discs 40, 40' in first and second disc-receiving pockets 202, 203 aligned with the front and rear panels 205, 206 of the cover portion 208 of the carrier 200. The pockets 202, 203 are formed by respective interior pocket panels 210, 211 that are interconnected to the front and rear cover panels 205, 206 and separated therefrom by a foldline 212. the interior pocket panels 210, 211 preferably include attachment flaps 214, 215 that are folded upon the interior panels 210, 211 and serve to attach the panels 210, 211 to the front and rear cover panels 205, 206 by adhesive deposits 216.

The folder front and rear cover panels 205, 206 are interconnected with each other by an intervening panel 220 defined by two foldlines 222a, 222b. The folder 200 includes an interior booklet 14 that is secured to the cover portion of the folder 200 by adhesive, staples or saddle–stitching 224 as shown. The foldlines 222a, 222b extend at an angle to the foldline 212 and preferably perpendicular thereto. In order to permit the folder 200 to lay substantially flat while in a closed position when the front cover panel 205 is folded upon the inner booklet 14 and the rear cover panel 206, the opposing inner edges 225, 226 of the interior panels 210, 211 are preferably offset at $O_1$, $O_2$ from the intervening panel 220 and the foldlines 222a, 222b that the booklet 14 is aligned with.

In order that the folder 200 may serve as a mailer, the folder 200 may include a sealing flap 228 as illustrated in FIG. 21, that is attached to one 206 panel of the front and rear cover panels 205, 206. This sealing flap 228 is located opposite the spine or backbone panel 220 of the folder 220 and extends over the open end 230 of the folder 200. An adhesive 230 may be used to affix the sealing flap 228 to the front cover panel 205. If desired, the sealing flap 228 may include lines of weakening, such as perforations 232, that define a tear strip 233 by which a user may gain access to the contents of the folder 200. The offset spacings $O_1$, $O_2$ between the two interior pocket panels 210, 211 may be considered as constituting a collective notch 240 that reduces the thickness of the folder 200 along the central intervening panel 220 and that prevents the formation of an unwanted gusset that would prevent the folder 200 from lying flat when closed and would prevent the proper sealing of it with the sealing flap 228.

Lastly, FIGS. 22 & 23 depict a sixth embodiment 250 of a dual compact disc paged carrier constructed in accordance with the principles of the present invention. This dual disc folder, or carrier 250, accommodates two compact discs 40, 40' in two disc-receiving pockets 251, 252 that lie between the front cover panel 254 and a single interior pocket panel 255. This interior panel 255 is interconnected to the front cover panel 254 and is separated therefrom by a foldline 258. The front cover panel 254 is likewise interconnected to a rear cover panel 256 and separated therefrom by a second foldline 259 that runs generally parallel to the first foldline 258. Adhesive deposits 260 are used to hold the interior pocket panel 255 to the first cover panel 254 and are preferably aligned with one or more attachment flaps 262 to form the disc-receiving pockets 251, 252.

A sealing flap 270 may be included as part of the rear cover panel 256 and disposed along one edge thereof. The flap 270 may include an adhesive deposit 272 for securement of it to the front cover panel 254. A multiple page booklet portion 14 is held between the two cover panels 254, 256 along the central foldline 259. The inner edge 275 of the pocket panel 255 is offset by a distance $O_3$ from the foldline 259 as in the folder 200 of the embodiment previously described. This offset $O_3$ permits the compact discs 40, 40' to be easily inserted into or grasped for removal from the two pockets 251, 252. The adhesive 260 may be arranged on either of the panels 254, 255 in any desired pattern to secure the attachment of the two panels together.

While the preferred embodiments of the invention have been shown and described, it will be apparent to those skilled in the art that changes and modifications may be made therein without departing from the spirit of the invention, the scope of which is defined by the appended claims.

What is claimed is:

1. A compact disc folder having a booklet shape, comprising: a cover portion and an internal booklet portion, the booklet portion having a plurality of pages and the cover portion enclosing the booklet portion pages, the cover portion including first and second cover panels that are separated from each other by a first foldline, first and second interior panels that are respectively connected to said first and second cover panels and further are separated therefrom by respective second and third foldlines, said first and second interior panels being respectively folded upon said first and second cover panels along said second and third foldlines to define therebetween first and second interior pockets of said folder, said second foldline substantially collinear with said third foldline, and said second and third foldlines intersect said first foldline, the first interior pocket being dimensioned to receive therein a compact disc and defining a disc-receiving pocket of said folder, said booklet portion pages being supported on said cover portion immediate said first and second cover panels such that said booklet portion pages lie adjacent said disc-receiving pocket.

2. The compact disc folder as defined in claim 1, wherein said cover portion includes an intervening spine panel disposed between said first and second cover panels adjacent said first foldline.

3. The compact disc folder as defined in claim 1, further including an intervening panel interposed between said first and second interior panels, said intervening panel being defined by a pair of first foldlines.

4. The compact disc folder as defined in claim 1, wherein said second and third foldlines, form a baseline of said folder and said and second interior panels are spaced apart from each other along said baseline.

5. The compact disc folder as defined in claim 1, wherein said cover portion is formed from a single paperboard blank.

6. The compact disc folder as defined in claim 1, wherein said folder second interior pocket defines a second compact disc-receiving pocket of said folder, said disc-receiving and said second disc-receiving pockets having respective first and second access openings formed therein through which compact discs may be inserted into and removed from said disc-receiving and said second disc-receiving pocket.

7. The compact disc folder as defined in claim 6, wherein said access openings are spaced generally parallel to said first foldline.

8. The compact disc folder as defined in claim 6, wherein said first and second access openings confront each other.

9. The compact disc folder as defined in claim 1, wherein said first and second interior panels are glued to said cover portion to form said first and second interior pockets of said folder.

10. A compact disc folder having a booklet shape, the folder comprising: a cover portion and at least one internal booklet portion, the booklet portion having a plurality of pages and the cover portion covering the booklet portion, the cover portion including first and second cover panels and a spine panel interconnecting the first and second cover panels, said folder further including a first interior panel separated from one of said first and second cover panels by first interior panel foldline, said first interior panel being folded upon said cover portion along said first interior panel foldline, said first interior panel being further attached to said cover portion in a manner to define a first interior pocket of said folder, the first interior pocket being dimensioned to receive a compact disc therein and defining a first disc-receiving pocket of said folder, the first disc-receiving pocket having an access opening by which a compact disc may be inserted therein and removed therefrom without the need for cutting any portion of said folder, said cover portion further including a second interior panel spaced apart from said first interior panel by a second spine panel interposed between and interconnecting said first and second interior pocket panels and an opening separating said first and second spine panels from each other, said second interior panel also being foldable upon said cover portion to define a second interior pocket of said folder, the second interior pocket being also dimensioned to receive a compact disc therein and defining a second disc-receiving pocket of said folder, the second disc-receiving pocket having an access opening by which a compact disc may be inserted therein and removed therefrom without the need for cutting a portion of said folder, said booklet portion being supported on said cover portion between said first and second cover panels such that said booklet portion pages are covered by said first and second cover panels when said folder is in a closed condition.

11. The compact disc folder of claim 10, wherein said first and second disc-receiving pockets open to the interior of said folder.

12. A paged, compact disc carrier for holding at least one compact disc and at least one booklet of printed material accompanying the compact disc, the carrier being foldable between an open position and a closed position, the disc carrier comprising: a cover portion having a first cover panel and a second cover panel that form front and back portions of said carrier when folded upon each other, the cover portion including a first interior pocket panel adjoining said first cover panel, the first interior pocket panel being foldable upon said first cover panel around a first foldline to define a first internal pocket of said carrier, said first and second cover panels having a second foldline disposed therebetween, and a first spine panel interposed between and interconnecting said front and rear cover panels, said cover portion further including a second interior pocket panel adjoining said second cover panel, the second interior pocket panel being foldable upon said second cover panel around a third foldline to define a second internal pocket of said carrier, said first and second interior pocket panels being interconnected together and separated from each other by a fourth foldline, said first and second internal pockets being spaced apart from each other along said cover portion by a second spine panel interposed between and interconnecting said first and second interior pocket panels, and an opening separating said first and second spine panels from each other, said first and second internal pockets generally overlying each other when said carrier is in said closed position, said carrier further including a booklet containing printed information, the booklet having multiple pages folded around a common centerline, said booklet being supported on said folder between said first and second internal pockets proximate to said second foldline so that said booklet is retained between said first and second cover panels of said folder when said carrier is in said closed position.

13. The compact disc carrier of claim 12, wherein said cover portion is formed from a paperboard blank.

14. The compact disc carrier of claim 12, wherein said booklet is interconnected to said cover portion by saddle-stitching.

15. The compact disc carrier of claim 12, wherein said booklet is interconnected to said cover portion by staples.

16. The compact disc carrier of claim 12, wherein at least one of said first and second internal pockets includes a compact disc-receiving pocket.

17. The compact disc carrier of claim 16, wherein said first and second internal pockets include respective access edges defining respective openings of said first and second internal pockets.

18. The compact disc carrier of claim 17, wherein said access edges are generally parallel to said cover portion first foldline.

19. The compact disc carrier of claim 12, wherein said first and third foldlines are substantially coincident with each other and said first and third foldlines are generally transverse to said second foldline.

20. The compact disc carrier of claim 12, wherein said interior and second interior pocket panels are spaced apart from each other and said cover portion first and third foldlines are coincident with each other.

* * * * *